(No Model.) 2 Sheets—Sheet 1.
W. A. LA FAVE.
DISINFECTING APPARATUS.
No. 598,103. Patented Feb. 1, 1898.
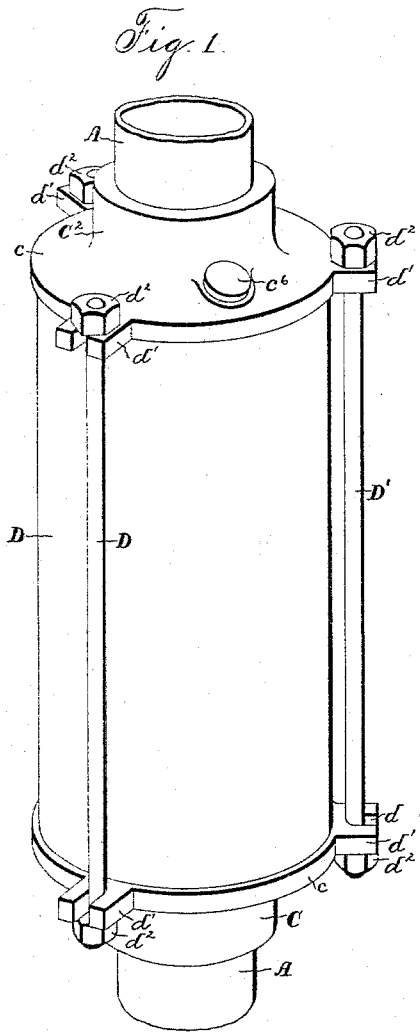
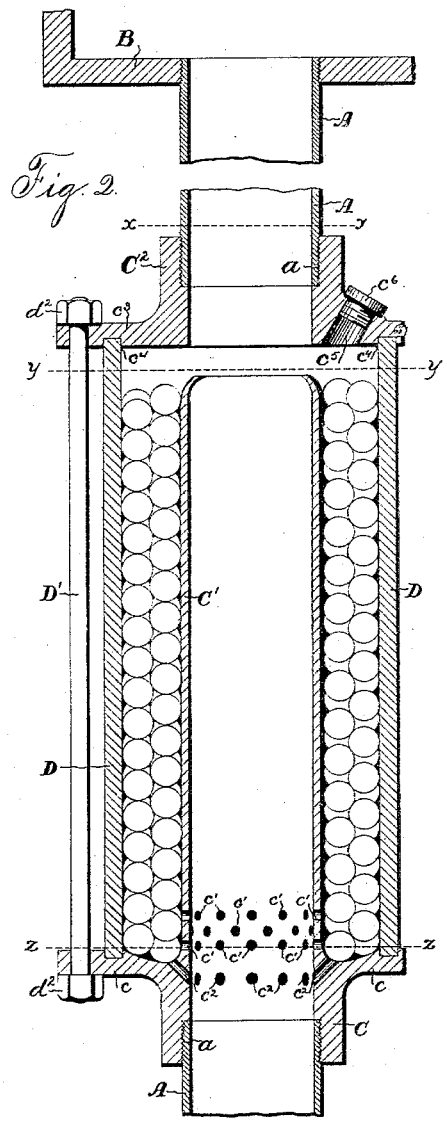
Witnesses
Frank P Prindle
Henry C. Hazard
Inventor
William A. La Fave
by Prindle and Russell
his Attorneys (No Model.) 2 Sheets—Sheet 2.

W. A. LA FAVE.
DISINFECTING APPARATUS.

No. 598,103. Patented Feb. 1, 1898.

Witnesses
Frank P. Prindle.
Henry C. Hazard.

Inventor
William A. La Fave
by Prindle and Russell
his Attorneys

UNITED STATES PATENT OFFICE.

WILLIAM A. LA FAVE, OF NEW HAVEN, CONNECTICUT.

DISINFECTING APPARATUS.

SPECIFICATION forming part of Letters Patent No. 598,103, dated February 1, 1898.

Application filed May 13, 1897. Serial No. 636,353. (No model.)

*To all whom it may concern:*

Be it known that I, WILLIAM A. LA FAVE, of New Haven, in the county of New Haven, and in the State of Connecticut, have invented certain new and useful Improvements in Disinfecting Apparatus; and I do hereby declare that the following is a full, clear, and exact description thereof, reference being had to the accompanying drawings, in which—

Figure 3:
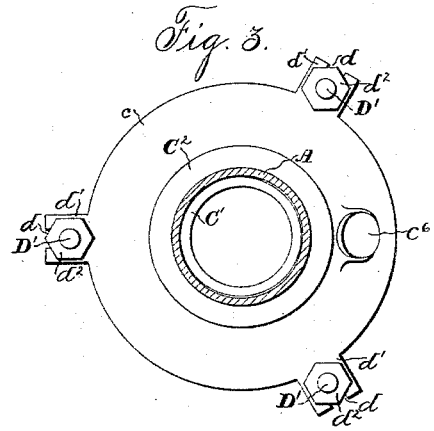
Figure 4:
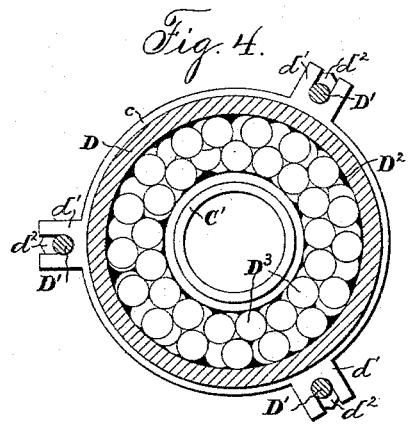
Figure 5:
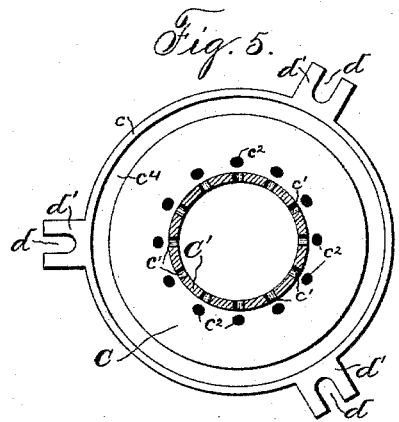

Figure 1 shows a perspective view of my disinfecting device; Fig. 2, a view of a vertical section of the same; Fig. 3, a view of a section on line $x\,x$ of Fig. 2; Fig. 4, a view of a section on line $y\,y$ of Fig. 2, and Fig. 5 a view of a section on line $z\,z$ of Fig. 2 with the disinfectant-retaining cylinder and the tie-rods removed.

Letters of like name and kind refer to like parts in each of the figures.

The object of my invention has been to provide improved means for disinfecting water-closets and the like which have a water-supply pipe or "flush-pipe;" and to this end my invention consists in the disinfecting device and in the parts thereof, constructed, arranged, and combined as hereinafter specified.

In carrying out my invention I apply a disinfectant-holding chamber directly to the water-supply pipe or flush-pipe which leads to the water-closet bowl or other receptacle to be supplied with water and disinfected, and connect such chamber with the pipe, so that a portion of the water from the latter will be taken off from the main stream passing through the pipe at any time and turned into the disinfectant-containing chamber, so that it will percolate down through the disinfectant, and having dissolved out some of the latter will flow into the pipe again, carrying the dissolved disinfectant with it, to the end that such disinfectant will be conveyed into the bowl or other receptacle into which the water from the pipe runs.

Where, as in water-closets using an intermittently-acting or a flush device to supply the water, the flow of the latter down through the flush-pipe is intermittent, the use of my device will insure, first, that a portion of the disinfectant shall pass down into the body of the flushing-water and that after the main water flow has ceased some of the water remaining in the disinfectant-chamber and percolating down through the disinfectant will carry some of the latter down into the bowl or receptacle at a time when it will not be carried immediately on and out of the bowl or receptacle and will remain therein to disinfect the same.

I desire it to be understood that while I shall herein describe my invention as applied to the water-supplying or flush pipe of a water-closet or other apparatus to which water is to be supplied I contemplate also using my invention in connection with the liquid-supplying pipe of any closet or other device using other liquid than water.

In the drawings, A designates the liquid-supplying or flush pipe through which the water or other liquid to be supplied is to flow from a suitable source of supply, which can be a liquid-containing tank as indicated at B in the drawings or of any other desired form.

The pipe A is separated into two opposing parts, as shown, and the two opposing ends are externally screw-threaded, as indicated at $a\,a$. Upon the threaded end of the lower part of the separated pipe is screwed a tubular piece C, having the flange $c$ and the upwardly-projecting tubular part C', the bore of which is in line with and forms a continuation of that of the pipe A. The bore of the tubular part C' is preferably of the same size as the bore of the pipe A, except at its upper end, where the part C' is contracted in diameter, so that its bore is slightly less in size than the bore of the pipe A. This construction is such that the opening in the upper end of the part C' is concentric with while being slightly smaller than the opening or bore in the pipe A above it, and the outer wall of the part C' is inclined outward and downward from the edge of the opening in the top of such part until it meets the cylindrical outer wall of the part below.

The lower end of the upper part of the separated pipe A is situated a short distance above the contracted upper end of the part C', so that when a body of liquid is rushing down through such part of pipe A the main part will pass directly on into the opening in the top of the part C', and a thin annular stream will be deflected from the outer part of such body by the inclined edge around the contracted opening in said part. The amount of the liquid which will be thus taken from the main body will depend, of course, upon the size of the opening or mouth in the part C' with reference to the diameter of the stream flowing to it from pipe A.

In practice I make the opening or bore of the upper end of the part C but very little less than that of pipe A, so that only a very small portion of the passing body of liquid is deflected. With this arrangement, there is no objectionable or material interfering with the free rush of the liquid, from the pipe A above, down into and through the part C', to and through the pipe A below.

The part C' is, at and near its lower end, provided with a series of perforations $c'c'$, extending through its walls to its interior. There are also, preferably, small passages $c^2 c^2$ passing down through the flange C into the base of the latter.

A second tubular piece $C^2$, having a flange $c^3$, but without any projecting portion corresponding to the tubular part C' of piece C, is screwed upon the lower end of the upper half of the separated pipe A and has its bore adapted to form a continuation of that of pipe A down to a point just above the contracted upper end of part C'.

A cylinder D, larger than part C', surrounds the latter and has its upper and lower edges seated in grooves $c^4 c^4$ in the flanges of pieces C and $C^2$, respectively. Tie-rods D' D' D', preferably three in number, pass through slots $d\ d\ d$ in lugs $d'\ d'\ d'$ on the respective flanges $c$ and $c^3$, and have their ends threaded and provided with nuts $d^2\ d^2\ d^2$, which engage the outer faces of the respective lugs $d'\ d'\ d'$, so that when the nuts are tightened up the flanges $c$ and $c^3$ on pieces C and $C^2$ will be drawn toward each other to seat the grooves $c^4 c^4$ in the flanges closely over the ends of cylinder D. With the cylinder ends thus seated in the grooves $c^4 c^4$ a closed chamber $D^2$ is formed, surrounding and concentric with the tubular part C', and having its upper end communicating with the main liquid-passage through the space between the piece $C^2$ and the top of the tubular part C'.

The liquid deflected from the main body by the contracted upper end of part C' will pass into the chamber at its upper end and can flow out of the lower end thereof through the perforations $c'\ c'$ and the passages $c^2\ c^2$, leading into the bore of piece C.

While I prefer the manner above described, and shown in the drawings, of putting together and connecting the parts of my disinfecting device, I do not limit myself thereto, but contemplate, where desired, making the whole part which connects the ends of the separated portions of pipe A in one or more pieces formed by casting or otherwise, as required, and to be attached to the pipe A in any suitable way.

However the device is made the essential idea of it is to have a chamber surrounding the passage for the water or other liquid used, and the end of the inner wall of such chamber which is toward the point from which the liquid flows formed with a lip projecting slightly inward into the path of the passing body of liquid, so as to deflect a portion therefrom into the chamber and to have suitable openings or passages through which the liquid deflected into the chamber may return again into the main liquid-passage.

The construction of the device described above and shown in the drawings I regard as preferable, because it enables me not only to construct and apply my disinfecting device cheaply, but to make the cylinder D of other material than the rest of the parts—as, for instance, of glass—so that the interior of the chamber $D^2$ and its contents can at any time be seen from without.

When my device is in use, I place in this chamber any desired kind of disinfectant, which can be either dissolved by the liquid used or disintegrated and carried out of the chamber thereby in small quantities.

Whatever the disinfectant used it is best in granular form, so that the liquid used can percolate easily down through the chamber contents and run out through the openings $c'\ c'$ and passages $c^2\ c^2$. As indicated in the drawings, the body of disinfectant $D^3$ in the annular chamber $D^2$ is in the form of small balls, which can readily be introduced into the chamber through the charging-opening $c^5$, which is provided in the upper piece $c^2$ and is kept normally closed during use of the device by a screw-stopper $c^6$ or any other suitable water-tight stopper.

The operation of my disinfecting device, which will be understood from the foregoing description and the drawings, is briefly as follows: With the chamber $D^2$ supplied with a quantity of the desired disinfectant which is to be used to disinfect the water-closet bowl or other receptacle to which the liquid used is to be supplied, as a quantity of liquid is allowed to flow from the source of supply through pipe A the main body of it can and does pass freely and unobstructed from the upper part of pipe A through the tubular piece $C^2$, the tubular part C', and the part C, and thence through the other part of the pipe A to the bowl or other receptacle. (Not shown.) As the body of liquid rushes from the piece $C^2$ into the part C' of the piece C a thin annular sheet is deflected from it by the inturned upper edge of the piece C', projecting, as described, slightly into the path of the body of liquid, and is guided outward and downward into the disinfectant-containing chamber $D^2$. As it descends through such chamber this deflected fraction of the body of liquid takes up a portion of the disinfectant from the mass of the latter, through which it passes, and carries it down and out through openings $c'\ c'$ and passages $c^2\ c^2$ into the path of the main body of the liquid. Some of this disinfectant-carrying liquid will flow into and mix with the said main body, so as to supply disinfectant to the same to act wherever the liquid goes through or from pipe A after leaving my device. Where, as is usual in water-closets, the flow of liquid from the source of supply is intermittent, the intention being to get a flushing action by allowing a certain quantity of liquid to dash or rush through pipe A into the closet-bowl, some of the liquid deflected into the disinfectant-chamber $D^2$ will, because of its flow being hindered by the disinfectant, continue to percolate down through the latter and run out through the openings $c'$ $c'$ and passages $c^2 c^2$ after the body of liquid issuing from the source of supply has rushed by the disinfecting device down pipe A. Such residuary disinfectant-carrying liquid will flow down through pipe A and, reaching the bowl or receptacle to be disinfected after the rush or flushing action has been completed, will not be washed on out of such bowl or receptacle, but will remain therein to disinfect the same.

Where my device is used to disinfect a pipe the residuary liquid containing disinfectant running down slowly from the disinfectant-chamber will, during its trickling or slow passage through the pipe to be disinfected, thoroughly disinfect the same.

My disinfecting device constructed as shown and described is cheap and simple in construction and easily applied to any pipe with which it is to be used. It has been found to be especially advantageous and desirable for use with the liquid-supply pipes of water-closets and other places where a flushing rush of liquid is desired, because it is so arranged as to take off the required amount of liquid to act upon and be charged with the disinfectant without materially interfering with or checking the rush of the flushing body of liquid through the supply or flushing pipe, and not only secures a mixture of some of the disinfectant with such body, but furnishes a supply of disinfectant-carrying liquid to the supply-pipe and bowl or other receptacle to be disinfected after the flushing rush of liquid has ceased.

I desire it to be understood that, if desired, the tubular part $C'$ can be made separate from piece C and screwed to or otherwise connected with such piece, and any other suitable means for connecting the tubular pieces C and $C^2$ can be used instead of the tie-rods and nuts without involving any departure from my invention.

Having thus described my invention, what I claim is—

1. In combination with a pipe, a disinfecting device having a tubular piece, with its bore in line with that of the pipe, and its end which is toward the pipe provided with an opening of less diameter than the bore of the pipe, and situated at a distance from the pipe end, and a chamber containing disinfectant, communicating with the space between the end of the tubular piece and the pipe, and with openings or passages leading into the path of any liquid passing through the tubular piece, substantially as and for the purpose specified.

2. In combination with a pipe, a disinfecting device having a tubular piece, with its bore in line with that of the pipe, situated at a distance from the pipe end, and having the edge of its end, which is toward the pipe, bent inward to make the bore of the piece, at that end, smaller than the bore of the pipe, and having, at a distance from such end, one or more openings through its walls, and a chamber for disinfectant connected with the space between the opposing ends of the pipe and tubular piece, and with the opening or openings in walls of the latter, substantially as and for the purpose described.

3. In combination with a pipe, a disinfecting device having a tubular piece situated at a short distance from the end of the pipe and having its edge, which is toward the pipe turned in to leave an opening smaller than the pipe-bore, one or more openings through its walls, at a point away from its contracted end, and an annular chamber surrounding the tubular piece and the space between the end of such piece and the end of the pipe, substantially as and for the purpose set forth.

4. A disinfecting device having the two tubular end pieces, a hollow casing forming, with such end pieces, a chamber, and an inner tubular piece, with its bore in line with that of the end pieces, its one end connected with one of the end pieces, and its other end standing at a short distance from the end piece having its edge turned inward to make its bore, at that point, smaller than that of the adjoining end piece, and one or more openings connecting the space between the tubular piece and the casing with the bore of the other end piece, substantially as and for the purpose described.

5. A disinfecting device having the two tubular end pieces, a hollow casing forming, with such end pieces, a chamber, and a tubular piece within such chamber, with its bore in line with that of the end pieces, its one end connected with one of the end pieces and its other end, standing at a short distance from the other end piece, having its edge turned in to make its bore at that point smaller, than that of the adjoining end piece, and one or more openings through the walls of the tubular piece, substantially as and for the purpose specified.

6. In a disinfecting device, in combination with the two tubular end pieces, a hollow casing forming, with such pieces, a chamber, a tubular piece within such chamber, with its bore in line with that of the end pieces of the same diameter, as that of such pieces, except at one end, such tubular inner piece being connected, at one end, with one of the end pieces, and having its other end, situated at a short distance from the other end piece, provided with an inturned edge, to contract its bore at that point, a body of disinfectant in the annular space between the tubular inner piece and the casing, and one or more openings or passages leading from the annular chamber into the path of any liquid passing through the tubular inner piece, substantially as and for the purpose described.

7. In combination with a liquid-supply pipe, a disinfecting device having an annular disinfectant-containing chamber, with the opening surrounded by its inner wall in line with the bore of the pipe, a passage through which liquid from the pipe can flow into one end of the annular chamber, the edge of the end of the inner wall of the chamber at this point being bent in to stand partly across the path of the body of liquid issuing from the pipe, and one or more openings or passages through the inner wall of this annular chamber, substantially as and for the purpose set forth.

8. In combination with two sections of a liquid-supply pipe, a disinfecting device interposed between the two sections and secured thereto, having an internal bore, in line with that of the pipe, an annular disinfectant-containing chamber around the internal bore, a liquid-passage, and an annular lip at such passage, to engage and deflect a portion of the body of water flowing from that part of the pipe which leads from the source of supply and guide such deflected portion into the chamber, and one or more openings or passages, through which any liquid in the annular chamber can flow back into passage followed by the main body of the liquid, substantially as and for the purpose described.

In testimony that I claim the foregoing I have hereunto set my hand this 10th day of May, 1897.

WILLIAM A. LA FAVE.

Witnesses:
LOVELL H. PAGE,
H. DAYTON STANNARD.